United States Patent
Tempe

[15] 3,653,871
[45] Apr. 4, 1972

[54] METHOD OF DISPOSING AND RECLAIMING SOLID REFUSE

[72] Inventor: Andre Tempe, P.O. Box 242, Budd Lake, N.J. 07828

[22] Filed: Aug. 4, 1970

[21] Appl. No.: 60,856

[52] U.S. Cl. ............................................. 71/8, 71/14
[51] Int. Cl. ............................... C05f 11/08, C05f 9/00
[58] Field of Search ................................. 71/8, 9, 14

[56] References Cited

UNITED STATES PATENTS

| | | |
|---|---|---|
| 3,236,604 | 2/1966 | Pierson ..................................... 71/9 X |
| 1,257,591 | 2/1918 | Dungan ..................................... 71/9 |
| 3,113,014 | 12/1963 | Foth ........................................ 71/9 |
| 2,734,803 | 2/1956 | Kuskin ..................................... 71/9 X |
| 3,246,953 | 5/1966 | Redman et al. ........................... 71/9 X |
| 3,579,320 | 5/1971 | Pesses ...................................... 71/12 |
| 3,246,954 | 5/1966 | Redman ................................... 71/9 X |
| 3,092,467 | 6/1963 | Tempe ..................................... 71/8 X |
| 2,929,688 | 3/1960 | Riker et al. .............................. 71/9 X |
| 2,220,134 | 11/1940 | Townsend ................................. 71/9 |

Primary Examiner—Reuben Friedman
Assistant Examiner—Richard Barnes
Attorney—Schellin and Hoffman

[57] ABSTRACT

This specification discloses a method of disposing of solid refuse and converting it into usable end products. Two basic groups of method steps are involved. One is the sorting of the refuse to segregate metals, cardboard, cartons and papers; bottles and glass; cloth and rags; and plastics, together with attending steps of treating the sorted components to reclaim them for usage. The second group of steps is the processing of the organic materials which remain after the above solids have been removed to convert it into usable organic fertilizer.

13 Claims, 26 Drawing Figures

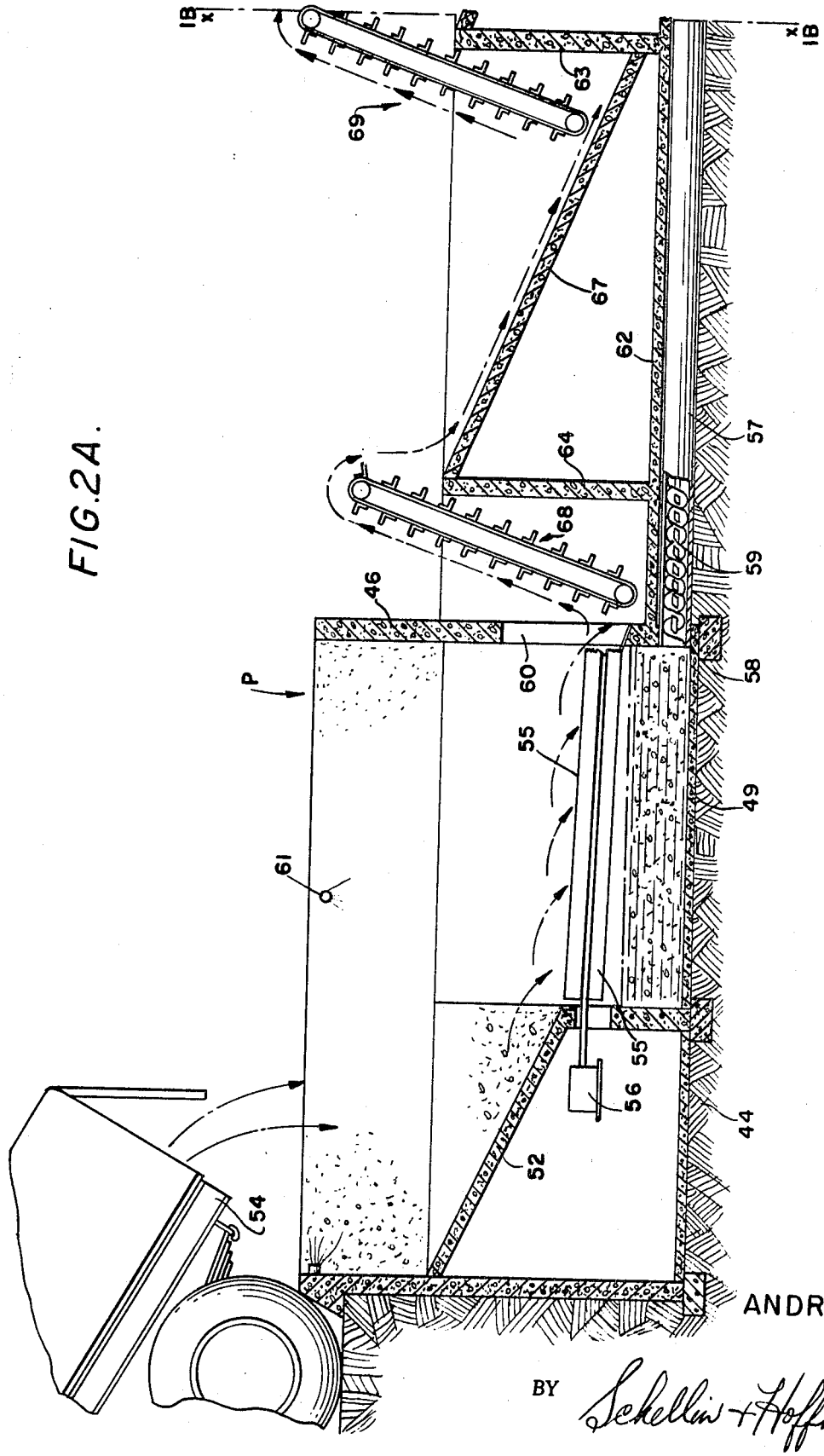

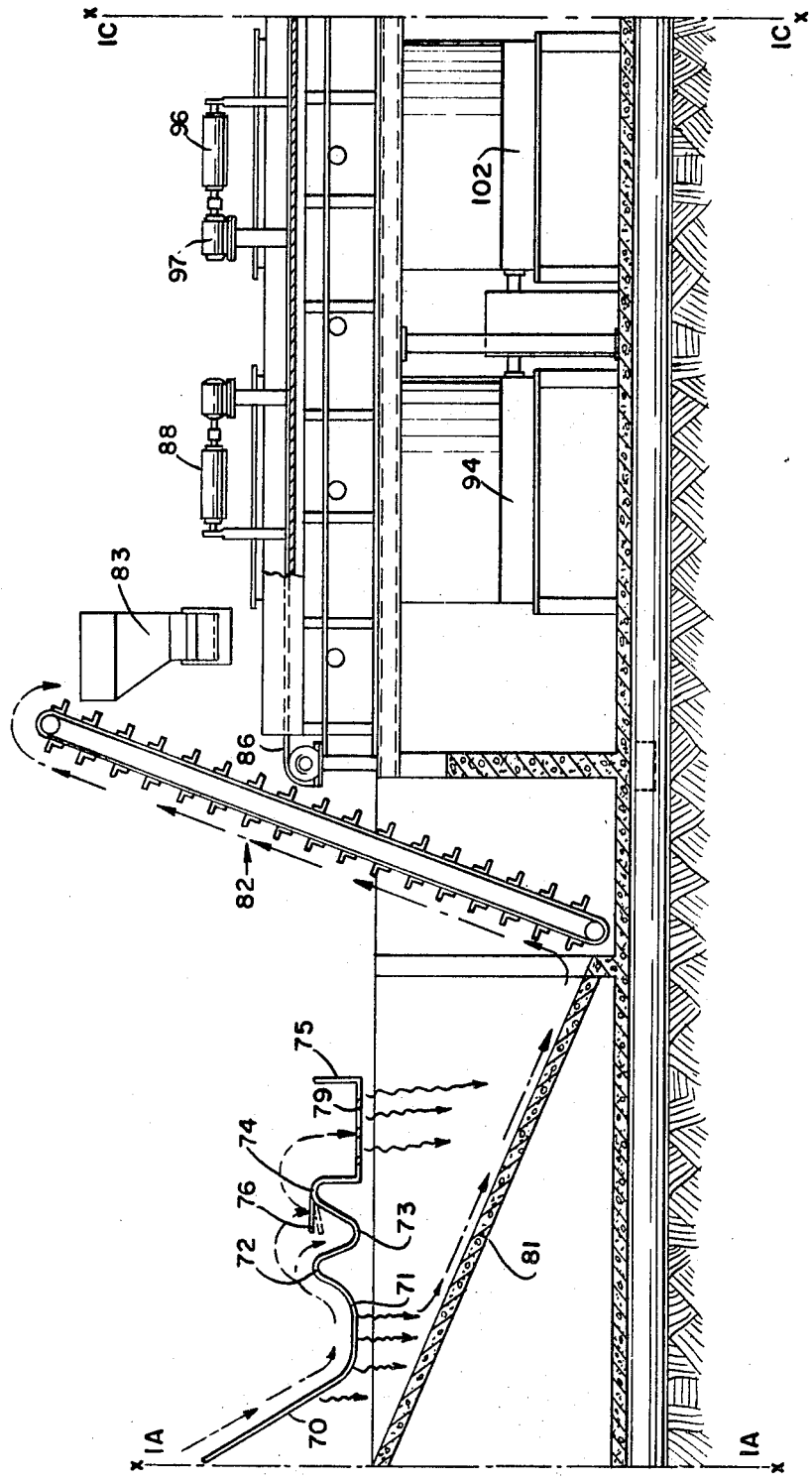

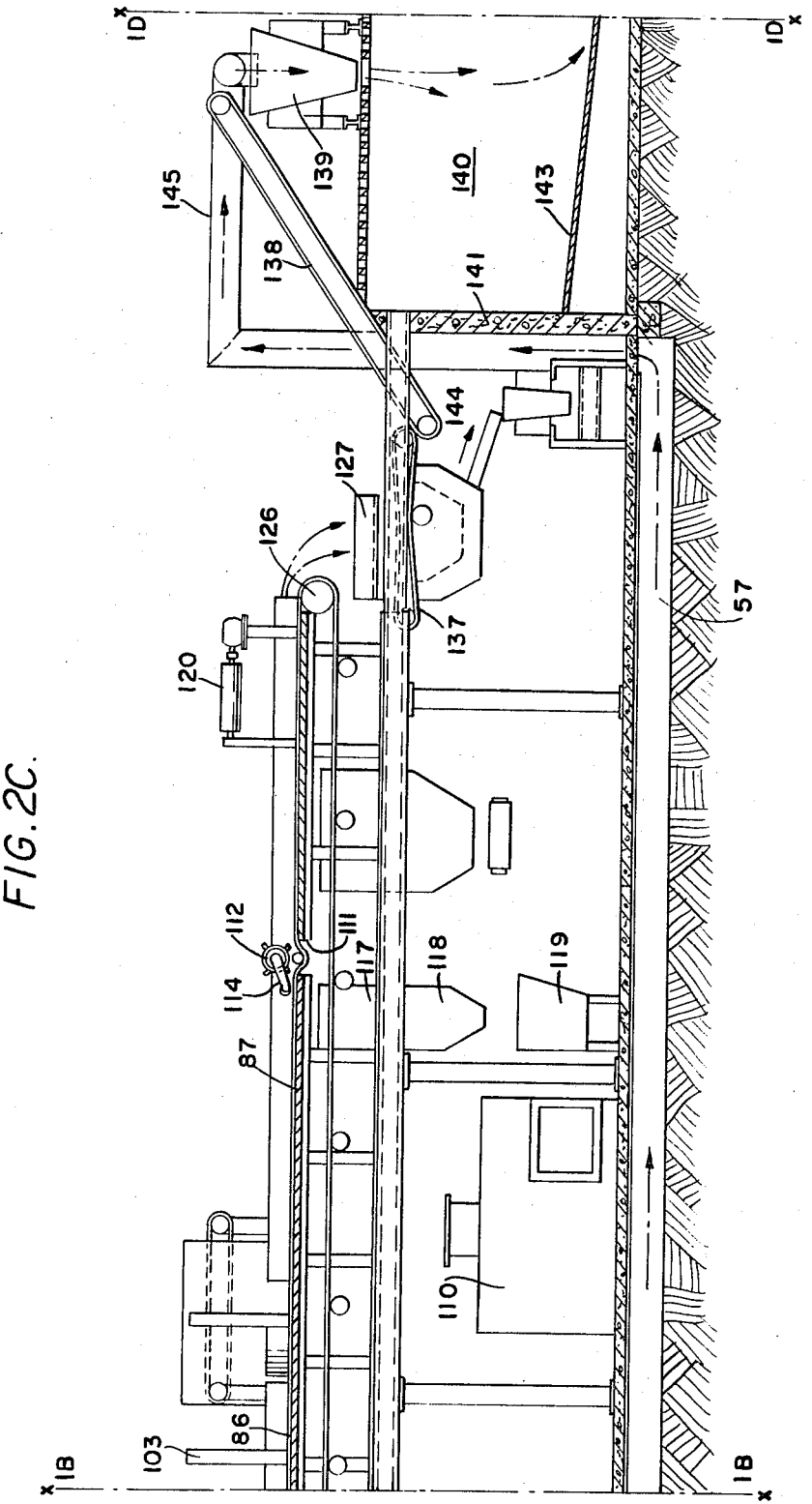

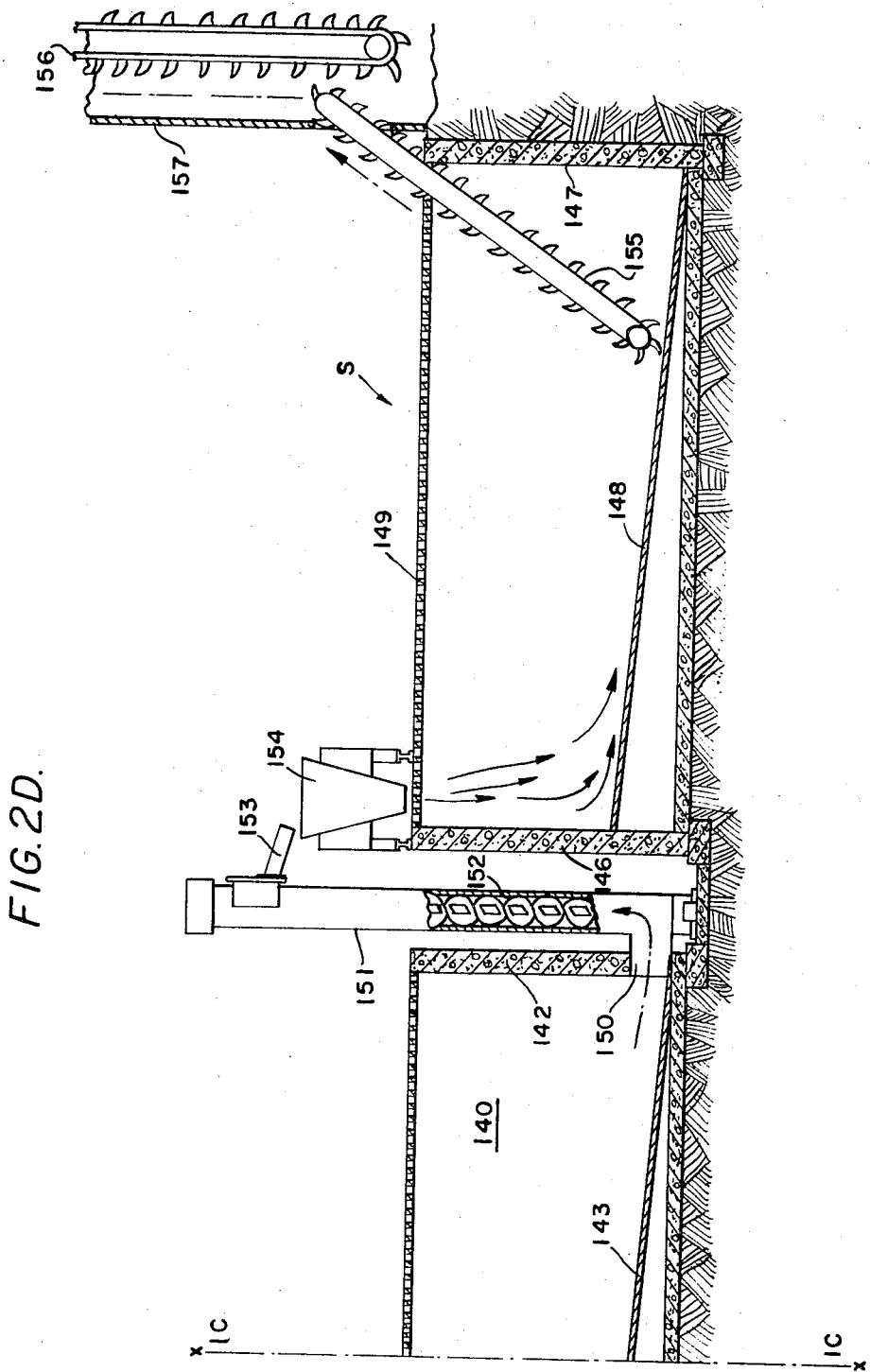

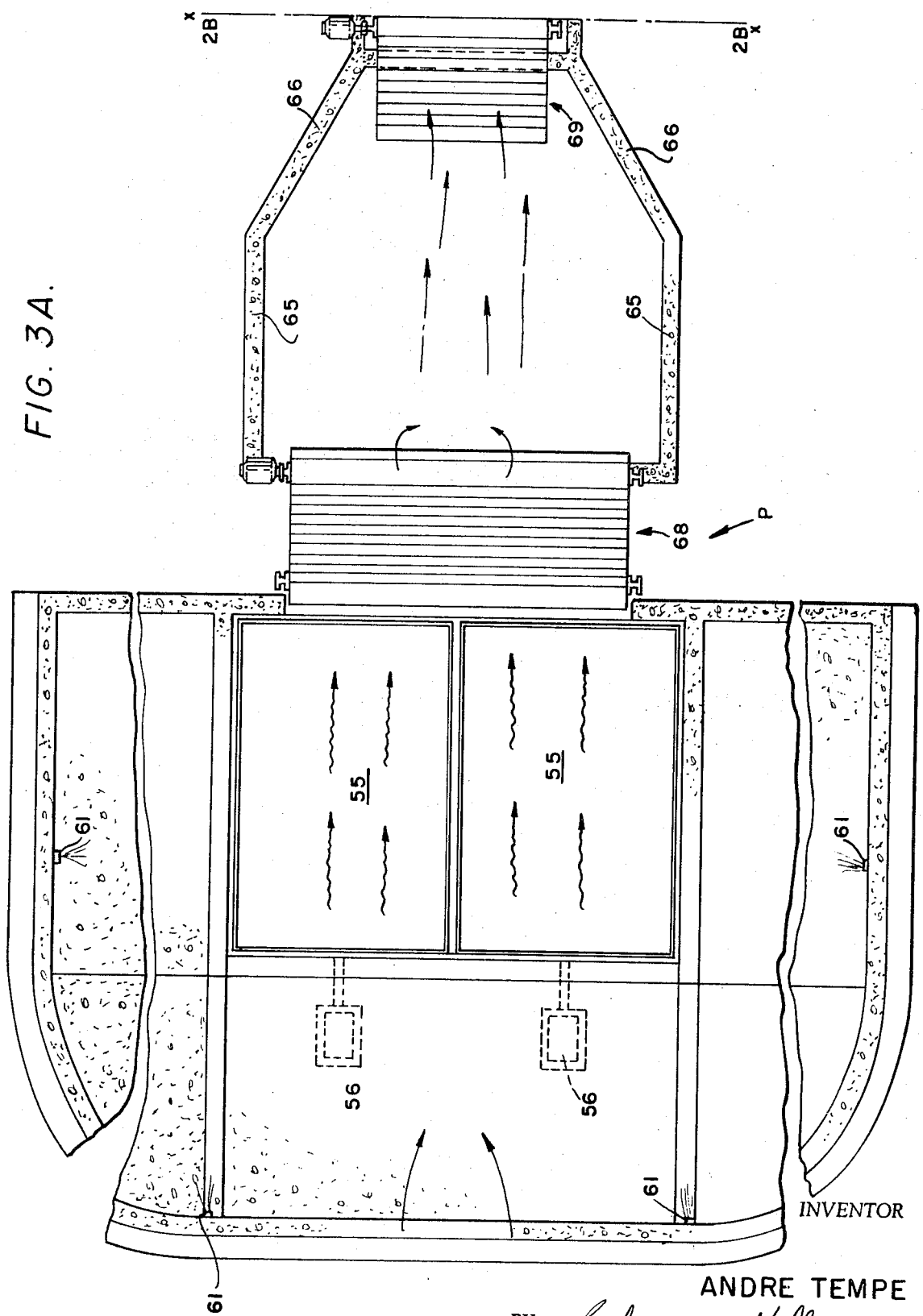

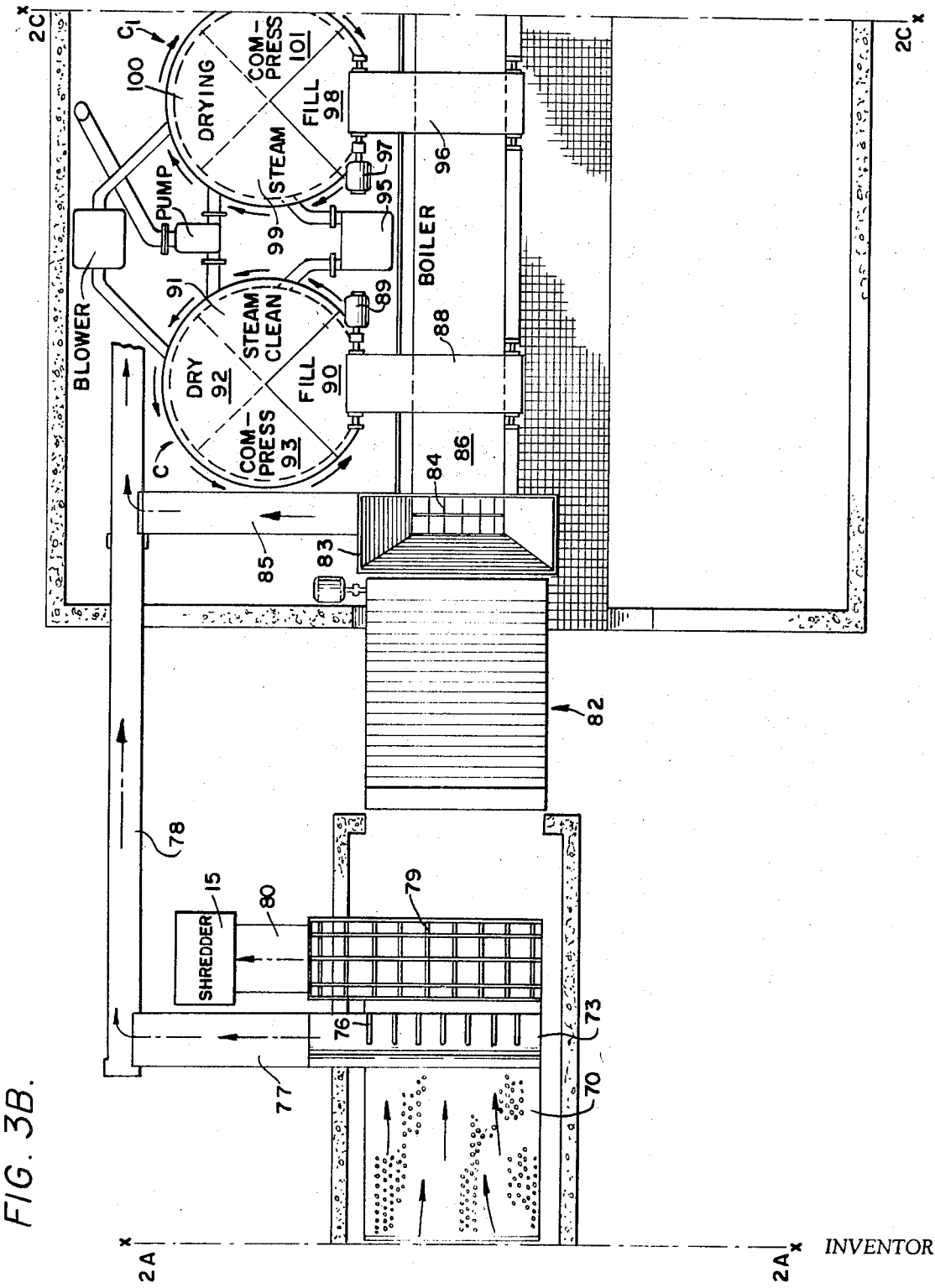

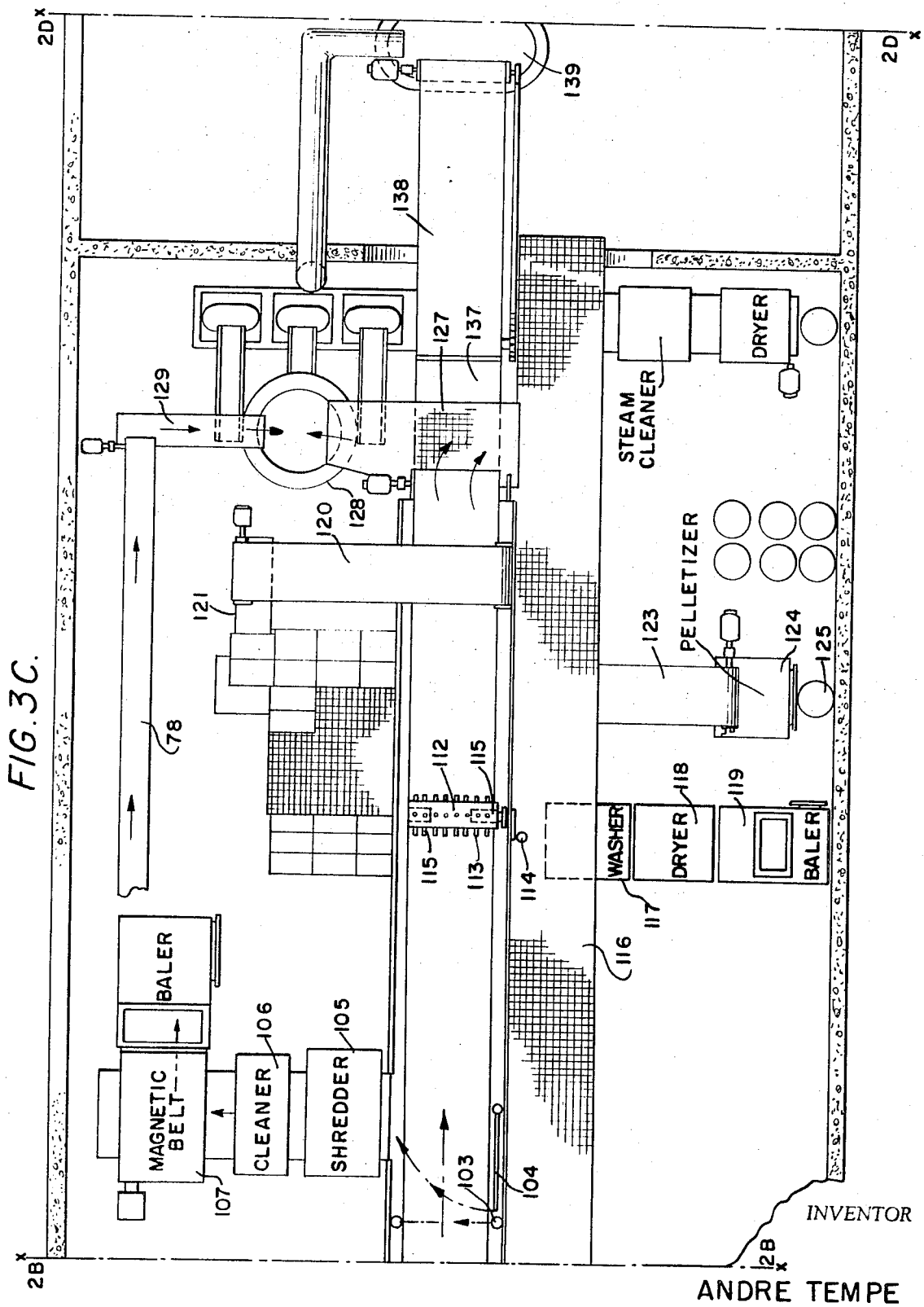

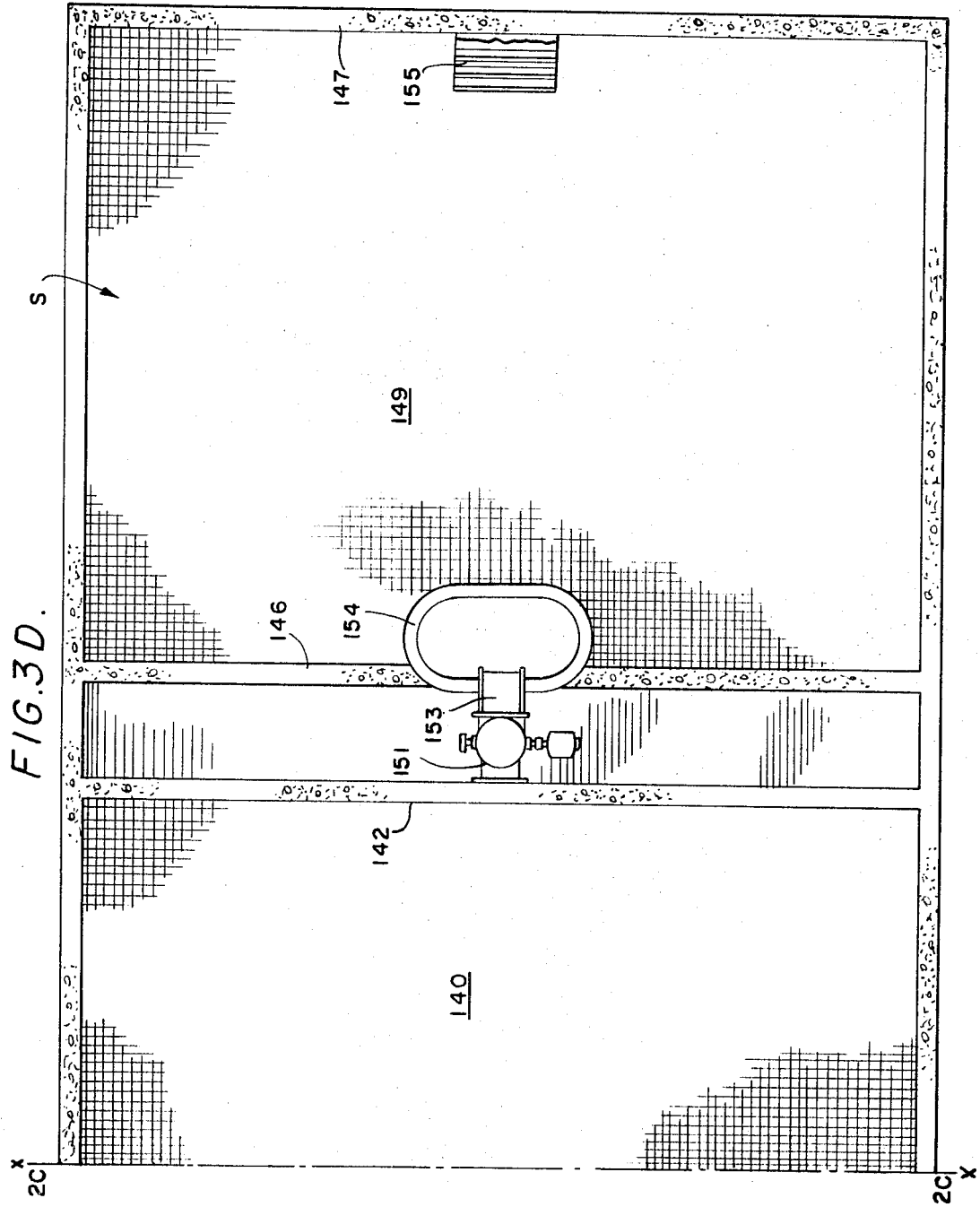

Patented April 4, 1972

INVENTOR
ANDRE TEMPE

BY Schellin + Hoffman
ATTORNEYS

INVENTOR
ANDRE TEMPE

BY Schellin + Hoffman
ATTORNEYS

Patented April 4, 1972 3,653,871

INVENTOR
ANDRE TEMPE

BY Schellin & Hoffman
ATTORNEYS

Patented April 4, 1972

INVENTOR
ANDRE TEMPE

BY Schellin & Hoffman
ATTORNEYS

Patented April 4, 1972

INVENTOR
ANDRE TEMPE

BY *Schellin + Hoffman*

ATTORNEYS

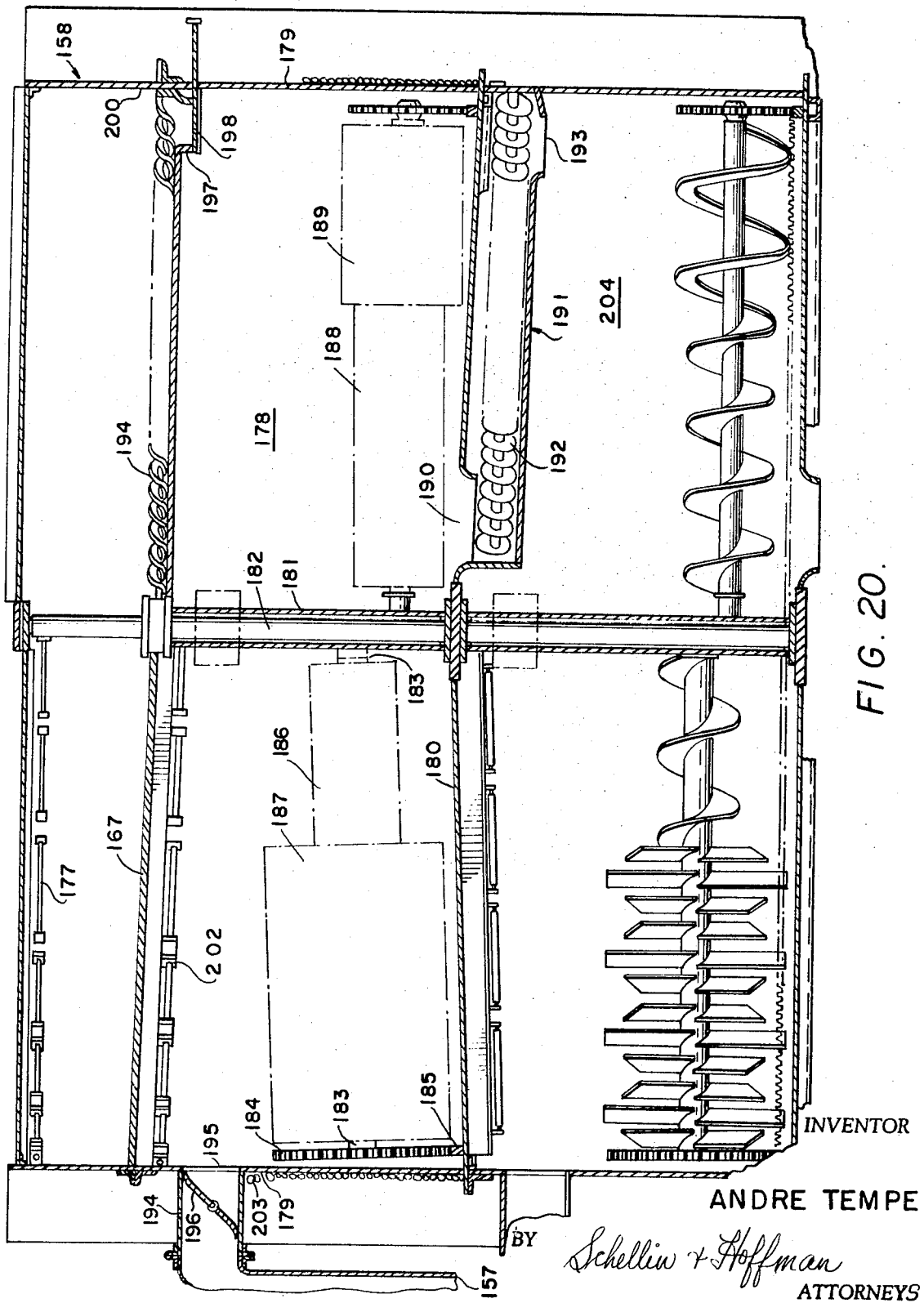

METHOD OF DISPOSING AND RECLAIMING SOLID REFUSE

The present invention relates to a method for disposing of all forms of solid refuse and converting it into usable end products and is concerned primarily with initial sorting during which all components of the refuse with the exception of organic materials are eliminated and the digesting of these organic materials to provide usable organic fertilizer.

BACKGROUND OF THE INVENTION

At the present time there are known methods of sorting refuse to separate components of a particular character therefrom. These known methods are normally related to a particular type of refuse among which might be noted household garbage and trash, garbage from commercial restaurants, municipal refuse, industrial refuse, and cannery refuse. It is believed that there is no known method which will accept all forms of solid refuse and sort it into the various components which may be then treated for conversion into a usable material.

There are also known and available to the public many methods for converting organic waste into compost. Compost does not have a nitrogen content sufficiently high to permit it to be sold as an organic fertilizer.

OBJECTS OF THE INVENTION

The present invention has as its primary object the provision of a method for disposing of all forms of solid refuse and converting it into various useful products.

Another object is to provide a method which accepts any form of solid refuse and after an initial spraying to neutralize odors, vermin, flies and insects is sorted to isolate organic fines; metals; cardboard, cartons and papers; cloths and rags; and plastics.

Another object is to provide a sorting method of the type noted which terminates with the organic refuse which remains after sorting whereupon the organic refuse undergoes a first grinding and the mixture subjected to a second grinding.

Another object is to provide in conjunction with the above described sorting steps for converting each of the materials which have been isolated into a usable form.

Another highly important object of the invention is to provide a method for digesting the ground organic refuse and converting it into usable organic fertilizer. The method should be continuous and automatic.

More in detail the invention has as an object the provision of a digesting method of the type noted which comprises eight stages which are: an aerobic stage, two thermophylic stages, a mezophylic stage, an actinomysenic stage, a saphrophlytic stage, a sterilization stage and cooling stage.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The above objects are achieved by first delivering the refuse regardless of character into a pit in which it is sprayed by a material of the lime, magnesium and chlorine group to neutralize odors, vermin, flies and insects. It is then subjected to shaking or vibration to eliminate organic fines.

The material is now removed from the pit and delivered to a conveyor but before being so delivered large bottles are removed. Small bottles are then removed after which ferrous metals are magnetically removed from the belt. The next step is the removal of non-ferrous metals by a vacuum device.

Paper and small pieces of cardboard are now removed from the conveyor whereupon rags are eliminated by a manually operable mechanism. Plastics are withdrawn from the conveyor by a vacuum device. At this stage only glass in various forms and organic materials are left on the conveyor. The glass is passed to a bottle separator and the organic materials to a primary grinder.

The large and small bottles removed at the earlier stages are delivered to an auxiliary conveyor which bypasses the succeeding stages and delivers these materials to the bottle separator.

Reclaiming processes are associated with each of the above steps to convert the particular material to a usable condition.

After the addition of sewage sludge and primary grinding the organic materials are ground a second time after which they are passed to a storage pit. From the latter they are delivered to a digester. In a preliminary step enzymes are added whereupon the organic materials undergo the eight digesting steps above mentioned.

For a full and more complete understanding of the invention reference may be had to the following description and accompanying drawings wherein;

FIG. 2A is a vertical section through the receiving pit and an auxiliary pit in which the solid refuse is delivered as the initial step of the subject method.

FIG. 2B is a vertical section that is a continuation of FIG. 1A and depicting the apparatus for carrying out the steps of: large bottles removal, cardboard removal, small bottles removal, ferrous metal removal and non-ferrous metal removal.

FIG. 2C is a further continuation of the vertical section and illustrates the apparatus for the steps of: paper removal, rag removal, plastic removal, glass separation and delivery to the primary grinder.

FIG. 2D is the final continuation of the vertical section and shows the passing of the organic material from the primary grinder to the secondary grinder.

FIG. 3A is a top plan view of the apparatus of FIG. 2A.

FIG. 3B is a top plan view of the apparatus of FIG. 2B.

FIG. 3C is a plan of the apparatus of FIG. 2C.

FIG. 3D is a plan of the apparatus of FIG. 2D.

FIG. 20 is a diametric vertical section through the tanks of the first two stages, being taken on an enlarged scale.

The subject method will be described in two sections. The first comprises the steps of the sorting of the solid refuse and apparatus for carrying out these steps. The second will be the digesting steps and associated apparatus.

THE SORTING APPARATUS

Figure 1:
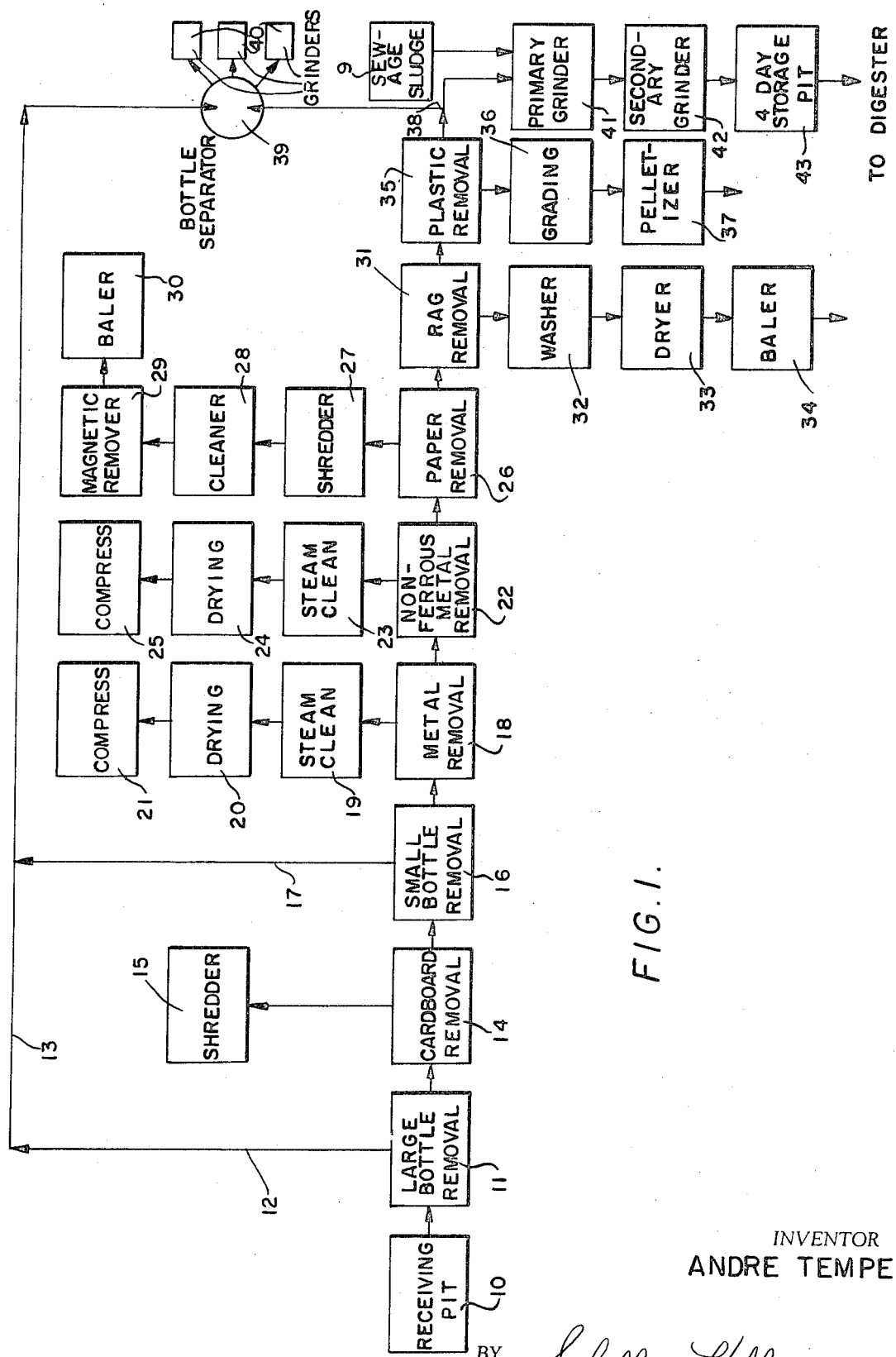
FIG. 1 is a flow sheet of the group of sorting and reclaiming steps.
Figure 4:
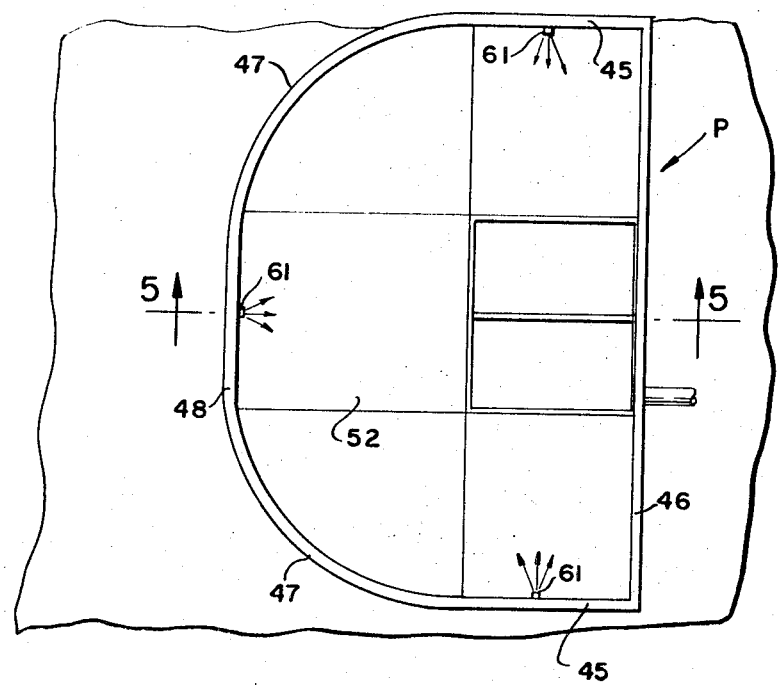
FIG. 4 is a detailed top plan of the receiving pit per se.
Figure 5:
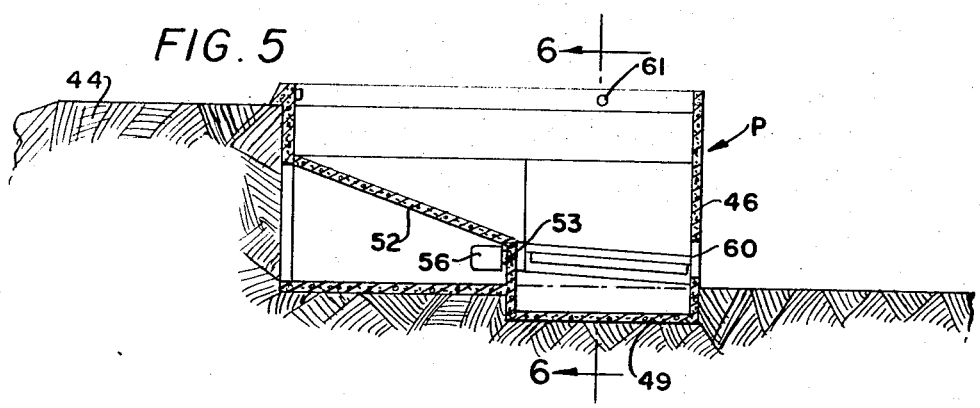
FIG. 5 is a detailed longitudinal section of the receiving pit, being taken about on the plane represented by the line 5 of FIG. 4.

Referring now to the drawings, and first more particularly to FIG. 1, the receiving station is represented at 10. The apparatus for performing the operations at this station is illustrated in FIGS. 2A, 3A, 4, 5 and 6.

The step of large bottle removal is designated 11. The mechanism for achieving this step is depicted in FIGS. 2B and 3B. The passage of bottles removed is represented by line 12 to an auxiliary conveyor depicted by line 13.

The step of cardboard removal is shown at 14. The removal mechanism is illustrated in FIGS. 2B and 3B. Passage of removed cardboard to a shredder 15 is indicated.

Small bottles are removed at station 16 and passed to conveyor 13 as represented by line 17. The devices of this station are shown in FIGS. 2B and 3B.

The removal of ferrous metal is depicted at 18. This apparatus is shown in FIGS. 2B, 3B, 7 and 8. After being removed from the main line the metal is subjected to steam cleaning at 19, drying at 20, and compressing at 21.

Non-ferrous metal is removed from the main line at station 22. This apparatus is depicted in FIGS. 2B and 2C. From station 22 the removed metal is steam cleaned at 23, dried at 24, and compressed at 25.

The station for the removal of paper and small pieces of cardboard is shown at 26. The apparatus at this station is illustrated in FIGS. 2C, 3C, 9 and 10. From station 26 the removed paper and cardboard is shredded at 27 and cleaned at 28. Small pieces of ferrous metal such as staples, will, on occasions, remain in the paper but are loosened by the shredding operation. They are magnetically removed at 29 and the shredded material baled at 30.

Rags are now removed at station 31. This is accomplished by the manually operated device shown in FIGS. 2C, 3C, 11 and 12. After being removed the rags are washed at 32, dried at 33, and baled at 34.

Plastics are removed by a vacuum device at station 35. These devices are shown in FIGS. 2C, 3C, 11, 12 and 13. From station 35 the plastics are passed to a grading station 36 where the pieces are sorted to size. They are then pelletized at 37.

At the station represented by point 38 of FIG. 1, glass and organic materials are all that remain on the main line. The glass is removed by apparatus shown in FIG. 2C, 3C, 14, 15 and 16. It is delivered to a bottle separation station 39 which also receives bottles from the auxiliary conveyor 13. After separation as to size they are ground by grinders represented at 40.

The organic material is passed to a secondary conveyor and delivered by it to a primary grinder 41. Before it is passed to grinder 41 sewage sludge is added as indicated at 9. It then goes to a secondary grinder 42 and from there to a storage pit 43 where it remains for a required period. This period is, from experience, indicated as 4 days. From the storage pit it is conveyed to a digester as will be later described.

Referring now more particularly to FIGS. 2A, 3A, 4, 5 and 6 a receiving pit is designated generally P. While a receiver might be built above the ground surface it is shown as built into a ground formation 44. Pit P is defined by straight side wall sections 45, joined at their end edges by a front wall 46 with curved wall sections 47 extending from their other edges and joining in with a rear wall section 48. These walls 45, 47 and 48 are preferably of concrete as are the bottom sections now to be described.

Figure 6:
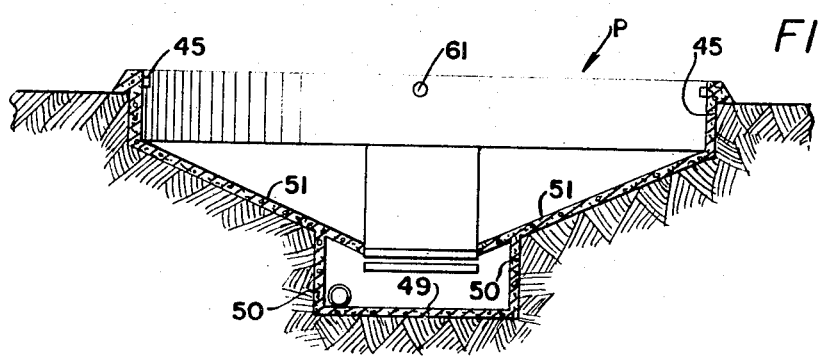
FIG. 6 is a detailed transverse section of the receiving pit, being taken about on the plane of the line 6—6 of FIG. 5.
Figure 9:
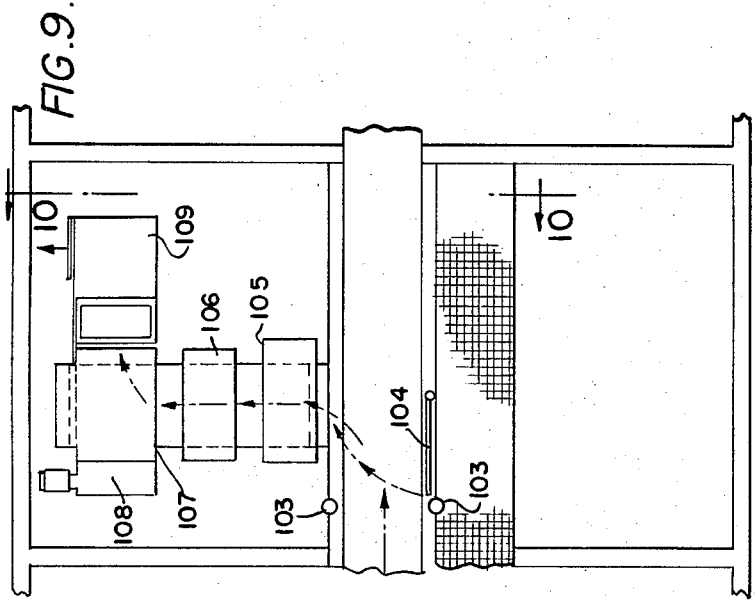
FIG. 9 is a detailed top plan of the mechanism at the step of paper removal.
Figure 10:
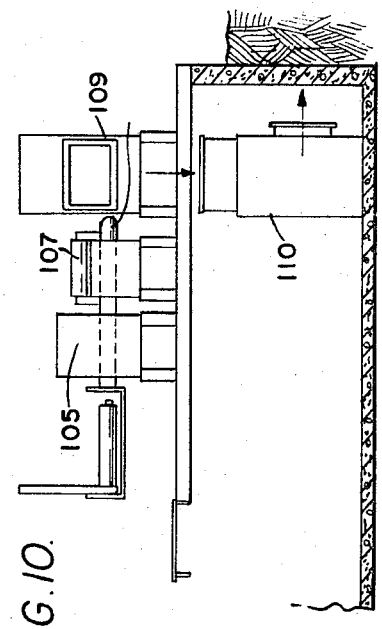
FIG. 10 is a detailed vertical section of the apparatus of FIG. 9, being taken about on the plane of the line 10—10 of FIG. 9.

A central lowerment bottom section 49 is located at the lower edge of wall 46. Upstanding therefrom are short side walls 50 (FIG. 6). Sloping downwardly from the lower edges of wall sections 45 are inclined bottom sections 51 which are continued over the upper edges of short walls 50.

Sloping downwardly and forwardly from rear wall 48 at a line spaced below the upper edge of rear wall 48 is a ramp 52 the lower front edge of which is connected to the upper edge of a short rear wall 53 that extends upwardly from the rear edge of bottom 49. It is evident that a truck, such as shown at 54 in FIG. 2A may dump solid refuse onto ramp 52.

Two pairs of grates 55 are positioned above bottom wall 49 in spaced relation thereto and are vibrated by motors 56. Organic fines pass through grates 55 and collect on bottom 49. A tube 57 (FIG. 2A) is embedded in ground 44 and one end thereof opens onto an opening 58 formed at the lower edge of wall 46. A screw conveyor 59 is operatively housed in tube 57 and delivers organic fines from the bottom of Pit P to a primary grinder as will be later described.

Formed in wall 46 in a position to receive refuse from grates 55 is a large opening 60. Just below the upper edges of wall sections 45 and 48 are spray nozzles 61 through which sprays are ejected to neutralize odors, vermin, flies and insects. The spray is an aqueous solution of one of the group of lime, magnesium and chloride.

Adjacent to the main receiving pit delineated by wall 46 is a concentrating pit defined by a bottom 62, front wall 63, rear wall 64 and compound side walls comprising rear sections 65 and front sections 66 (FIG. 3A). Extending from the upper edge of rear wall 64 to the lower edge of front wall 63 is a ramp 67.

An elevating conveyor 68 is located in the space between walls 46 and 64. Its lower end is disposed at opening 60 and its upper end overhangs the upper edge of ramp 67. Conveyor 68 takes refuse from opening 60 and drops it onto ramp 67. It is concentrated by the converging wall sections 66. A second elevating conveyor 69 is positioned to extend in an inclined position over the upper edge of wall 63. The lower end of elevator 69 is positioned adjacent to the lower end of ramp 67 to pick refuse therefrom.

Referring now to FIGS. 2B and 3B, the refuse passes onto an apron 70 the lower end portion of which is formed with a shallow trough 71 (FIG. 2B). Apron 70 and trough 71 are perforated as shown in FIG. 3B. Integral with the forward edge of trough 71 is a rounded ridge 72 and integral with this ridge is a chute 73 of a rounded V cross section. The forward edge of chute 73 is shown at 74 and connected thereto is the rear wall of a wide channel 75.

Anchored to edge structure 74 are a plurality of widely spaced spring fingers 76. Chute 73 is inclined laterally, that is upwardly in the showing of FIG. 3B. Large bottles fall between fingers 76 onto chute 73. They then move laterally onto a continuation 77 of chute 73 and thence to an auxiliary conveyor 78. Elements 77 and 78 are represented by the lines 12 and 13 of FIG. 1.

Formed in the bottom of channel 75 is grating 79 of a wide mesh. This grating is inclined laterally in the same direction as chute 73. Large pieces of cardboard are caught by grating 79 and due to its inclination are moved onto an inclined plate 80 and thence to shredder 15.

Disposed beneath apron 70, trough 71, chute 73 and channel 75 is a forwardly inclined ramp 81. The latter receives material which has fallen through the perforations in apron 70 and trough 71, and grating 79. An inclined elevator 82 takes material from the lower end of ramp 81 and passes it into a hopper 83 having a bottom in the form of a small mesh grating 84. The latter is inclined laterally and there is an opening in the hopper wall at the side wall closely adjacent to conveyor 78 through which small bottles caught by grating 84 pass onto an inclined plate 85 and thence to conveyor 78.

A main conveyor 86 of the endless belt type receives the refuse that passes through grating 84. The upper ply of conveyor 86 is supported by a table 87 (FIG. 2C). A magnetic separator belt 88 is mounted in a transverse position over main conveyor 86 and is driven by motor 89. It picks up ferrous metal from conveyor 86 and delivers it to a cylindrical receptacle designated generally C (FIGS. 3B and 7).

Figure 7:
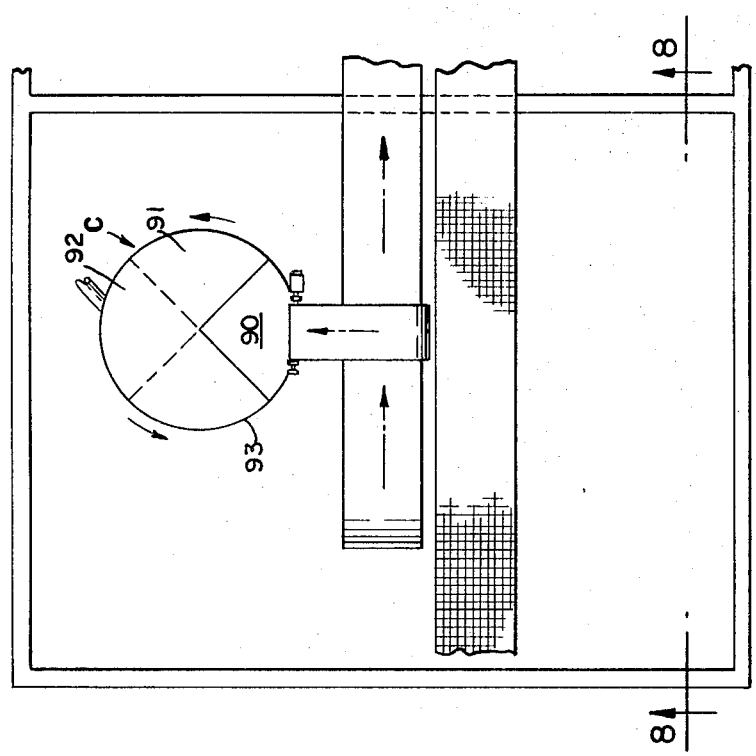
FIG. 7 is a detailed top plan of apparatus for removal of ferrous metal.

Receptacle C is divided into four segments of 90° each, and it is driven in a counterclockwise direction as shown in FIGS. 3B and 7. Each section is designed to have each of four operations carried on therein as the receptacle is rotated intermittently. Thus in the position illustrated section 90 is being filled. After it is filled receptacle C is rotated 90° and an empty section is brought into position at the fill station while the section previously there is moved to a steam cleaning station represented at 91. It is then moved to a drying station 92 and from there to a compressing station 93. The compressed metal is emptied from that section whereupon the latter returns to the filling station.

Figure 8:
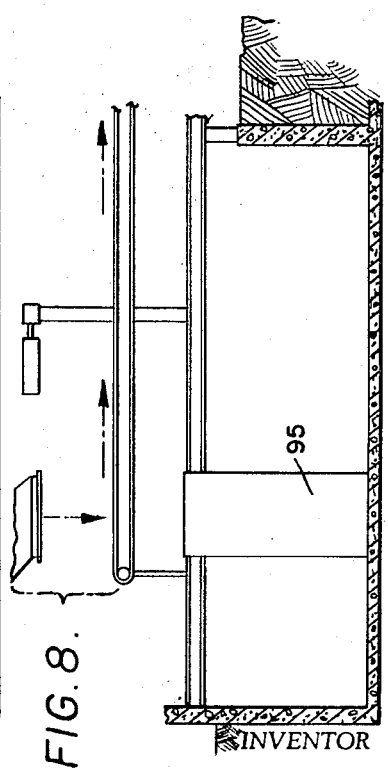
FIG. 8 is a detailed vertical section of the apparatus shown in FIG. 7, being taken on the plane of the line 8—8 of FIG. 7.
Figure 11:
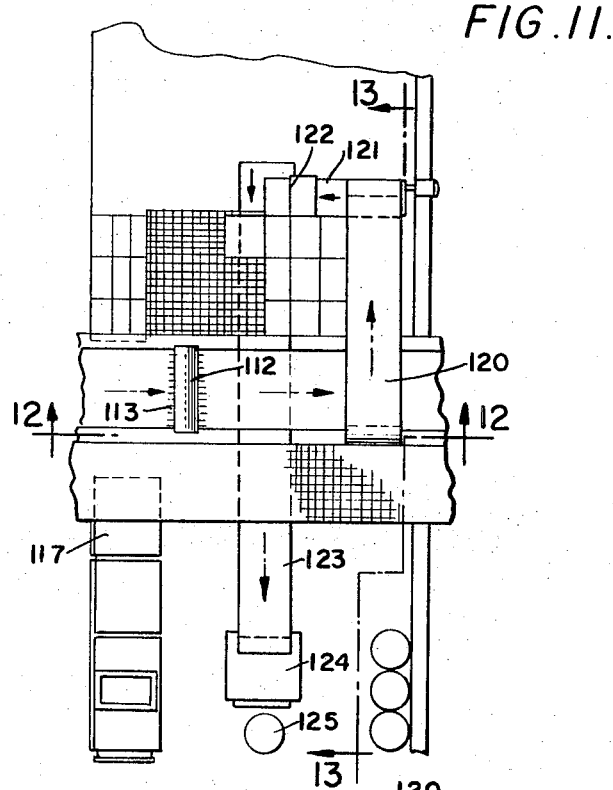
FIG. 11 is a detailed top plan of the mechanism for rag and plastic removal.
Figure 12:
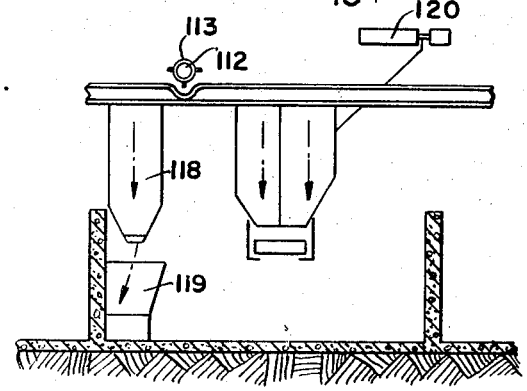
FIG. 12 is a detailed longitudinal vertical section through the mechanism of FIG. 11, being taken about on the plane of line 12—12 of FIG. 11.

Material that is discharged from receptacle C at station 90 falls onto a conveyor belt 94 (FIG. 2B) that extends transversely of main conveyor 86 therebelow. A boiler for supplying steam for the cleaning operation is shown in FIG. 8 as being located beneath the level of main conveyor 86 and is designated 95.

The apparatus for carrying out the removal of non-ferrous metal at station 22 appears in FIGS. 2B and 3B. It comprises a vacuum pick up belt 96 driven by motor 97 and extends over main conveyor 86, being spaced thereover an appropriate distance. Non-ferrous metal is discharged from the conveyor 96 into a cylinder designated generally C1 and which is similar to receptacle C. It is divided into four segments of 90° with each segment stopping at a station where an operation is performed. Thus station 98 is the fill station. At station 99 the metal is steam cleaned, at station 100 it is dried, and at station 101 it is compressed.

Cylinder C rotates in a clockwise direction and steam for cleaning is supplied by boiler 95. Compressed metal is discharged from station 101 onto a belt 102 (FIG. 2B) positioned beneath main conveyor 86.

The mechanism for removing paper, small pieces of cardboard and the like represented by station 26, and related steps of stations 27, 28, 29 and 30 are illustrated in FIGS. 2C, 3C, 9 and 10.

A sensor 103 such as a photoelectric cell and a light beam provides for the latter extending across main conveyor 86 at a required height whereby it is interrupted by pieces of the type noted which extend to that height. When this occurs a conveyor arm 104 is actuated to move these pieces off main conveyor 86 and into a shredder 105. The material is then cleaned at station 28 (FIG. 1) by a cleaner 106.

Small pieces of ferrous metal such as rivets will often be present in material of this character. They are loosened by the shredding operation and are adapted for removal by a magnetic separator 107. The shredded paper left falls onto a short conveyor 108 that delivers it to hopper 109 from which it passes to a baler 110 positioned therebelow.

The apparatus for the rag removal of station 31 and associated stations 32, 33 and 34 will now be described. This apparatus is illustrated in FIGS. 2C, 3C, 11 and 12. Table 87, on which main conveyor 86 is supported, is interrupted to provide a gap 111(FIG. 2C). A cylinder 112 having spikes 113 is rotatably mounted above gap 111 and is manually operated by a handle 114. Main conveyor 86 is directed into gap 111 to form a transverse depression therein by two rollers 115 which are mounted on stub shafts (not illustrated) which extend into gap 111 from opposite sides of conveyor 86.

When an operator standing on platform 116 sees rags on conveyor 86 cylinder 112 is rotated to pick them up. They are then hand removed from cylinder 112 and charged into a washer 117. They are then dried by dryer 118 and baled by baler 119.

Figure 13:
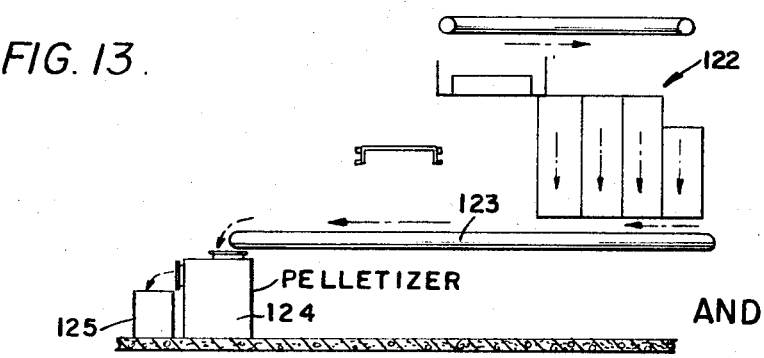
FIG. 13 is detailed transverse section of the mechanism of FIG. 11, being taken on the plane of the line 13—13 of FIG. 11.
Figure 14:
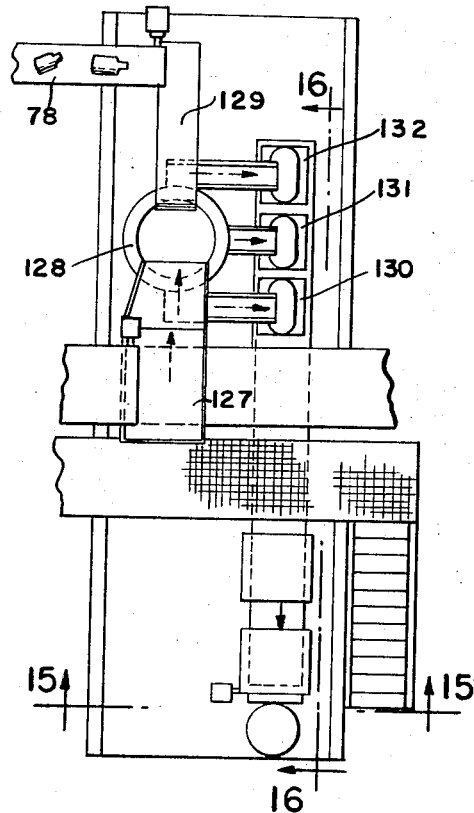
FIG. 14 is a detailed plan of the glass removal and grinding apparatus.
Figure 15:
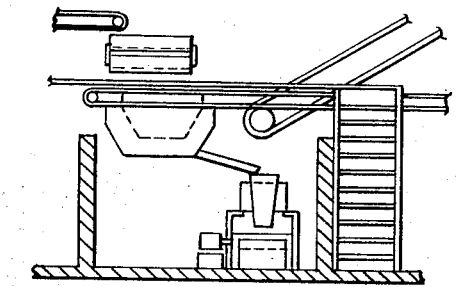
FIG. 15 is a detailed longitudinal vertical section through the apparatus of FIG. 14, being taken on the plane of the line 15—15 of FIG. 14.
Figure 16:
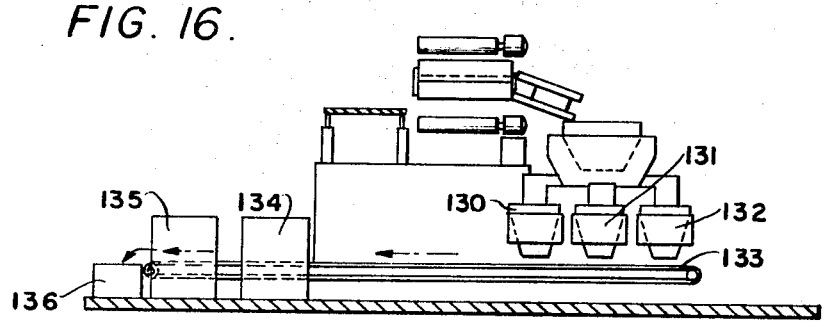
FIG. 16 is a detailed transverse vertical section through the apparatus of FIG. 14, being taken on the plane of the line 16—16 of FIG. 14.

Plastics are removed at station 35 by a vacuum belt 120 shown in FIGS. 2C, 3C, 11 and 12. From vacuum belt 120 they pass to a conveyor 121 on which they are sorted as to size and delivered to an appropriate bin of the bin assembly 122 (FIG. 13). While this grading could be achieved mechanically for the purposes of this specification it is manual.

One of the bins of assembly 122 is selectively emptied onto a conveyor 123 which passes the plastics to a pelletizer 124. The pellets are packaged at 125.

Conveyor 86 ends at roller 126 (FIG. 2C). At this point only small pieces of glass which might include small bottles and organic materials remain on conveyor 86. This mixture is dumped onto a screen 127 which is inclined laterally. Screen 127 intercepts the small glass pieces and passes them to a cyclone separator 128. Large and small bottles from stations 11 and 16 are delivered by conveyor 78 and conveyor 129 to separator 128.

Hoppers 130, 131 and 132, each of which includes a grinder, receives bottles within different size ranges from bottle separator 128. These hoppers are positioned over an endless belt conveyor 133 (FIG. 16) which is adapted to receive the ground glass from the grinder of any hopper which may be selected. This selection is manual. Conveyor 133 delivers the glass material to a steam cleaner 134 from which it passes to a dryer 135 and is packaged at 136.

As shown more clearly in FIG. 2C a secondary conveyor 137 is disposed below screen 127. This conveyor 137 receives the organic material which passes through screen 127 and delivers it to an inclined conveyor 138. The upper end of the latter discharges into a primary grinder 139. Below grinder 139 is a pit 140 including an end wall 141 (FIG. 2C) and a second end wall 142 (FIG. 2D). Between these end walls 141 and 142 extends an inclined bottom 143 which moves the ground material towards end wall 142.

Referring now to FIG. 2C, tube 57 is shown as terminating at the lower edge of end wall 141. Positioned vertically on the outer face of wall 141 is a tube 144 which connects with tube 57 and which, like tube 57, houses a screw conveyor similar to screw 59 (FIG. 2A). Another tube 145 is connected to the upper end of tube 144 and also houses a screw. Thus organic fines are passed from pit P through tubes 57, 144 and 145 to primary grinder 139.

Referring now to FIGS. 2D and 3D, a multiday storage pit is designated generally S. It comprises end walls 146 and 147 with the former being spaced from wall 142 of pit 140. It also includes a bottom 148 which slopes from wall 146 to wall 148 and a top grating 419.

End wall 142 of pit 140 is formed with a discharge opening 150 at its lower edge. A tube 151 housing a screw conveyor 152 is disposed vertically between end walls 142 and 146 and its lower end communicates with opening 150. Tube 151 carries at its upper end a discharge spout 153 the lower end of which is positioned over a secondary grinder 154 supported from grating 149.

DIGESTING

Organic material in a finely ground condition is delivered to an eight stage digester to convert it to a fertilizer having a high nitrogen content. Before being subjected to the first stage enzymes are added in a controlled proportion. The eight stages are carried out in eight tanks arranged in vertically superimposed relation.

The first stage which is carried out in the uppermost tank that receives the ground organic fines. The ground material will contain enzymes which are added and will have a large water content. The moisture of the material in the first stage is stabilized to a required standard by withdrawing water from the bottom thereof and diverting it outside the tank. Outside the tank and adjacent to the wall thereof is a large coil to which an electric current is passed to induce a magnetic flux. The polarity of this flux is automatically reversed at periodic intervals. About the upper edge of the tank are a plurality of light tubes containing one of the rare gases among which might be noted argon, neon and xeon. These light tubes generate actinic light which is effective on the material in the tank. This material is also subjected to mechanical agitation derived from a screw assembly which rotates as an entirety within the tank and which comprises two horizontal screws. The aerobic fermentation which takes place in the tank raises the temperature thereof to a predetermined degree. This temperature is employed as a controlling factor in withdrawing a certain amount of material from the bottom of the tank and delivering it to the tank immediately therebeneath in which the second stage takes place. This same factor also controls the delivery of the material from the conveyor to the first tank. This first stage is carried out under atmospheric pressure.

In the second stage the tank is hermetically sealed and the stage is carried out under subatmospheric pressure. There is no moisture stabilization and the actinic light is changed and is derived from light bulbs containing a rare gas different from those used in the first stage. The bacterial action in the second stage is thermophylic.

The temperature in the third stage rises to a predetermined degree and is the controlling factor in withdrawing a portion of the treated material therefrom and delivering it to the tank immediately therebeneath in which the third stage is conducted. This stage is also a thermophylic stage and is similar to the second stage with the following exceptions.

1. The character of the actinic light is altered to be derived from a rare gas different from those employed in the first two stages.

2. Catalytic action takes place due to the coating of the screws with a material which functions as a catalyst due to the friction generated by the material passing thereover. Among such materials are molybdenum, cobalt, tungsten, cadmium, nickel, and silver. The temperature is also raised in the third stage and is used in controlling the delivery of a portion of the material therefrom to the tank therebeneath in which the fourth stage is performed.

In the fourth stage the action of the bacteria changes from thermophylic to mezophylic. The only difference between the apparatus of the third and fourth stages resides in the source of the actinic light. In the fourth stage the actinic light is generated from a rare gas different from that in the first three stages.

The temperature is raised further in the fourth stage and when a predetermined temperature is reached a portion of the material is delivered to the tank immediately therebeneath in which the fifth stage takes place. The apparatus and action in the fifth stage is like that of the fourth stage with the following exceptions.

1. The catalyst is changed by employing a screwblade coating different from that used in the preceding stage.

2. An actinic light different from that in the second, third, and fourth stages is utilized.

In the fifth stage the bacterial action is changed from mezophylic to actinomysenic.

When the temperature reaches a predetermined degree in the fifth stage a portion thereof is delivered to the tank immediately therebeneath in which the sixth stage is conducted. In this stage the bacterial action changes from actinomysenic to saphrophyltic. This is done under the influence of a different actinic light and certain isotopes of the carbon group are added.

In the sixth stage the temperature is increased to that of pasteurization.

When the latter temperature is achieved, a portion of the material is delivered to the tank immediately therebeneath in which the seventh stage takes place. In this stage the actinic light action is eliminated and the catalytic action is altered by changing the materials employed for coating the screws. The tank in the seventh stage functions as an autoclave in which sterilization takes place to destroy or render ineffective pathogenic bacteria and viruses such as salmonella, typhus, tetanus and others. In the seventh stage waste produces from the line group are introduced. Saphrophylites are not destroyed in this stage.

The eighth stage is the cooling stage at which the temperature of the material is lowered but is still at a point above ambient temperature. The material is withdrawn from the eighth stage in a warm and plastic state. In this condition it may be compacted into carpet, brick, or pellet from which constitutes a usable organic fertilizer.

Figure 17:
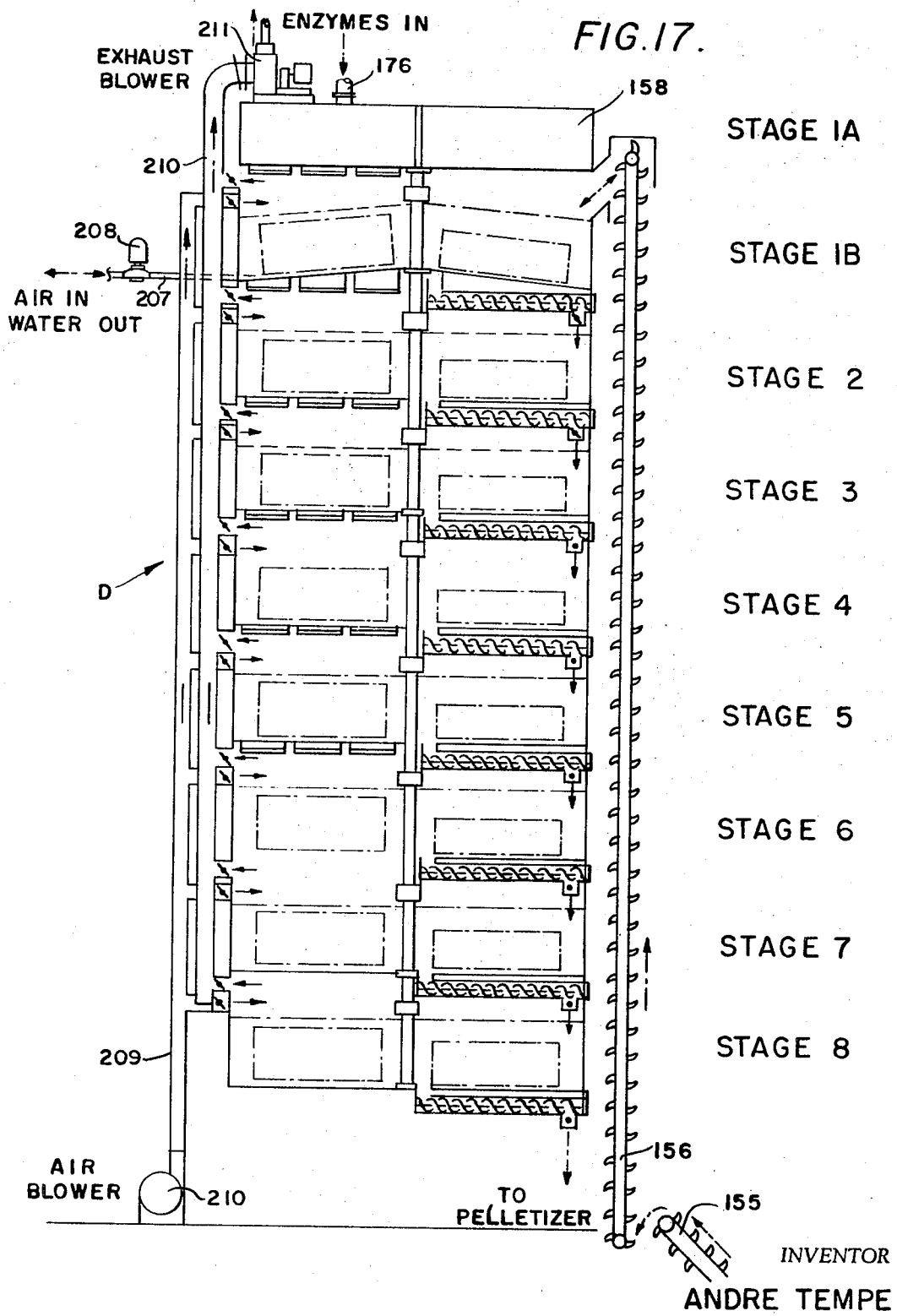
FIG. 17 is a sectional view, somewhat diagrammatic, taken as a vertical section through the digester.

Referring again to FIG. 2D, an inclined conveyor 155 is positioned in pit 5 and passes through an opening in grating 149 and over end wall 147. It delivers ground material to vertical conveyor 156 mounted within a casing 157 that is attached to the digester. Conveyors 155 and 156 are shown in FIG. 17 to which reference is now made.

Figure 18:
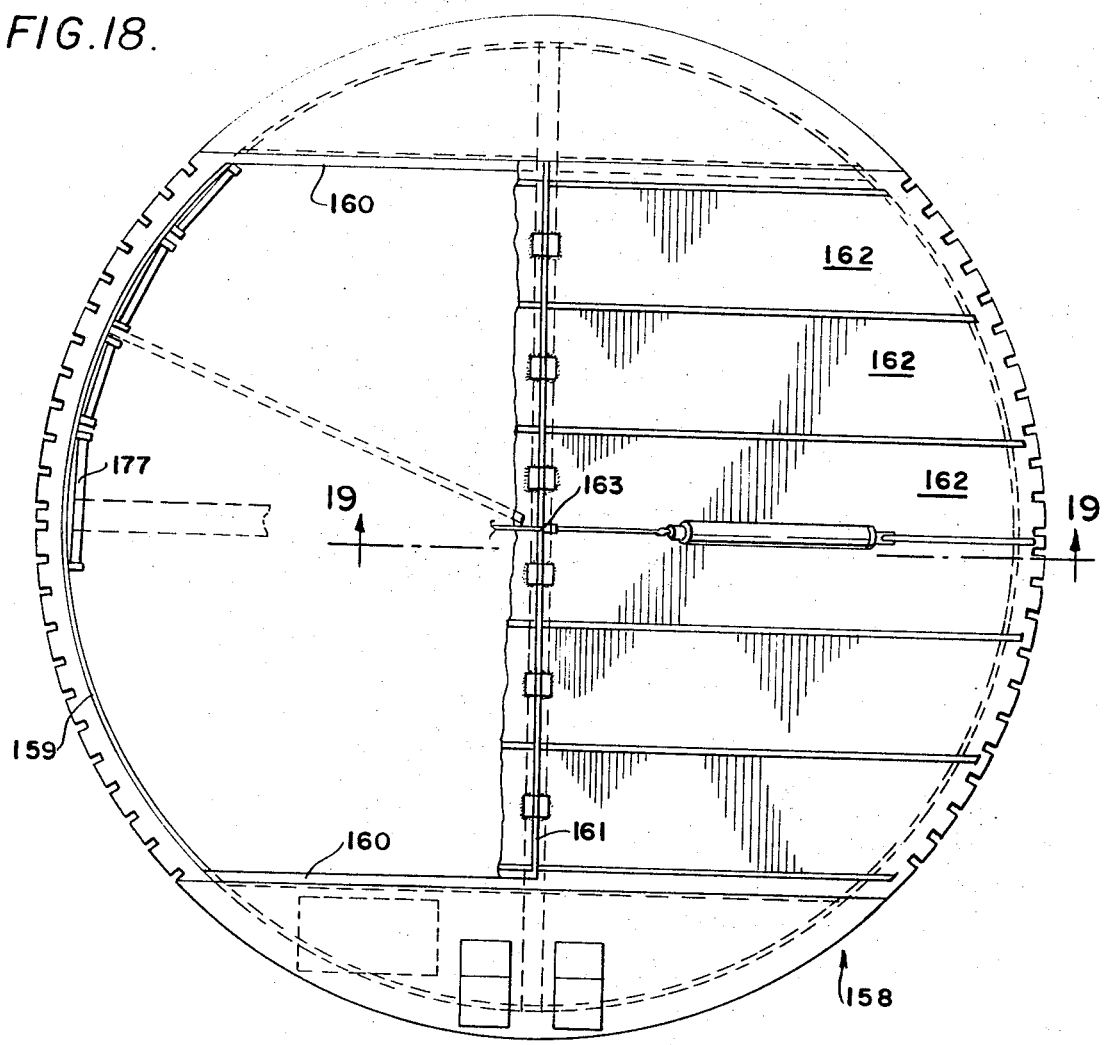
FIG. 18 is a top plan view of the digester with the tank which introduces enzymes to the first stage positioned on top of the tank for the first stage.
Figure 19:
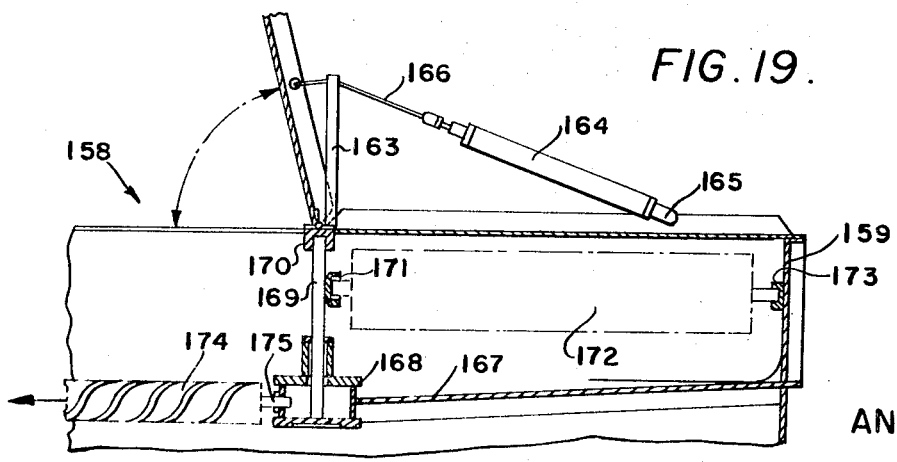
FIG. 19 is a detailed vertical section through a portion of the tank shown in FIG. 18, being taken on the plane of the line 19—19 of FIG. 18.

A digester is designated generally D. Structure elements are omitted because they are not particularly relevant to the subject method. Stage 1A is the step at which enzymes such as in the form of yeast are added to the material to be treated. For this purpose a cylindrical tank 158 is positioned at the top of the digester D. Tank 158 is illustrated in FIGS. 18 and 19. It comprises a vertical wall structure made up of curved portions 159 which are segments of a cylinder and straight end walls 160. Extending between the latter, and centrally thereof is a shaft 161. A cover comprising a plurality of panels 162 is hingedly mounted on shaft 161 and covers one half of the open top of tank 158. A second cover of identical size and shape covers the other half of the open top.

Fixedly secured to shaft 161 and upstanding from the center thereof is a vertical strut 163. A hydraulic cylinder and piston device 164 has one end secured to one cover at 164 while a line 166 has one end anchored to the top of strut 163 and its other end to the piston of the device 164. It is operable to raise or lower the cover. Another cylinder and piston assembly identical with that described is provided for the other cover.

Tank 158 includes a bottom 167 that is conical on a small angle. Secured to the center of bottom 167 is a bearing 168 and upstanding therefrom is a rod 169, the upper end of which is attached to a channel member 170 which supports shaft 161. Carried by rod 169 is a bearing 171 in which is journalled one end of an agitator represented diagrammetrically at 172. The other end of the latter is journalled in a bearing 173 mounted on a wall segment 159. Agitator 172 is power driven by mechanism not illustrated.

A discharge screw 174 is mounted in the lower region of tank 158 having one end journalled in bearing 168 as shown at 175 and its other end in a wall segment 159. It is power driven and feeds enzyme material to the first digesting stage represented by stage 1B in FIG. 17. The latter shows tank 158 as having an inlet 176 for enzymes. As shown in FIG. 18, wall segments 159 carry actinic lights 177 which enliven the enzymes.

Referring now to FIG. 20, the first stage of the digesting process is carried out in the tank designated generally 178. It comprises a top in the form of bottom 167 of tank 158, a cylindrical wall 179 and a bottom 180. Extending between the midpoints of the top and bottom of tank 178 is a tube 181 housing a shaft 182. A shaft 183 has one end journalled in a bearing carried by tube 181 and is inclined radially downwardly away from tube 181. The outer lower end of shaft 183 carries a gear 184.

Bottom 180 is fixed, and mounted on the upper face thereof is a circular rack 185 with which gear 184 meshes. Thus as tube 181 is rotated under power by mechanism not illustrated, shaft 183 is rotated. Drivably mounted on shaft 183 are two helical agitators 186 and 187. Another set of agitators 188 and 189 are mounted on tube 181 in diametrically opposed relation to agitators 186 and 187.

Bottom 180 is formed with a discharge opening 190 which opens onto a tube 191 housing a screw conveyor 192. Adjacent to wall 179, tube 191 has a discharge aperture 193 which delivers material to the tank of the second stage.

Tube 157 (FIG. 2D) which houses vertical conveyor 156 is connected to a sleeve 194 which opens onto an opening 195 in wall 179. A gate valve 196 is pivotably mounted in sleeve 194 and controls delivery of material to tank 178.

Bottom 167 of tank 158 is also formed with a discharge opening 197. Discharge of enzyme containing material through opening 197 is controlled by a valve 198 which may be of the sliding type.

Suspended from the periphery of tank 158 are actinic light tubes 202. Encircling the outer surface of wall 179 are magnetic coils 203 to which current is applied and the polarity of which is reversed as above described.

The second stage is carried out in tank 204. This tank is substantially similar in structure to tank 178 with the exception that the magnetic coils are omitted. In normal operation, material passes from tank 178 into tank 204 through opening 190, tube 191 and aperture 193.

Stages 3 to 8 inclusive are performed in tanks similar to tank 204.

Referring now to FIG. 17, a pipe 207 extends into tank 178 and is provided with a valve 208. This valve is opened when water is to be exhausted at the first stage. Another pipe 209 extends from blower 210 to tank 178. It supplies air for any of the stages when required.

An exhaust pipe 210 communicates with the tank of each stage and is activated by blower 211.

The function and mode of operation at each stage are believed to be obvious from the descriptions of the method set forth above.

While a preferred specific embodiment of the invention is hereinbefore set forth, it is to be clearly understood that the invention is not to be limited to the exact steps, methods and devices illustrated and described, because various modifications of these details may be provided in putting the invention into practice.

What is claimed is:

1. In the disposal and reclaiming of solid refuse, a completely mechanical and substantially automatic method comprising the steps of:
    a. delivering solid refuse to a receiving pit,
    b. spraying the refuse in the pit by a material selected from the group consisting of lime, magnesium and chlorine,
    c. mechanically shaking the refuse in the pit to remove organic fines therefrom which collect at the bottom of the pit,
    d. concentrating the refuse after it leaves the receiving pit and passing it to an inclined converging apron down which it travels by gravity action,
    e. sifting the refuse at the lower end of said apron whereby refuse of small size falls onto a ramp,
    f. mechanically removing large bottles after the sifting operation,
    g. mechanically removing large pieces of cardboard after the large bottles have been removed, at the same time,
    h. screening refuse of small size which may have been left after the sifting operation and passing it to the ramp under gravity action,
    i. passing the refuse from the lower end of the ramp to a small bottle remover from which the refuse with the small bottles removed passes onto a continuously moving conveyor, then
    j. magnetically removing ferrous metals from the conveyor,
    k. removing nonferrous metals from the conveyor by vacuum,
    l. mechanically removing paper from the conveyor,
    m. mechanically removing rags from the conveyor,
    n. removing plastics from the conveyor by vacuum,
    o. mechanically separating glass pieces from the remainder of the refuse as said remainder leaves the conveyor,
    p. combining the organic fines collected in the receiving pit with the remainder of the refuse from the conveyor,
    q. grinding the combined material, and
    r. digesting the ground material to provide fertilizer.

2. The method of claim 1 in which the large pieces of cardboard are shredded after separation.

3. The method of claim 1 in which the ferrous metal is steam cleaned, dried and compressed after removal from the conveyor.

4. The method of claim 1 together with the steps of steam cleaning, drying and compressing the non-ferrous metal after removal from the separator.

5. The method of claim 1 together with the steps of shredding the paper after removal from the separator, cleaning the paper, removing any ferrous metal which has been loosened by the shredding, and then baling the shredded paper.

6. The method of claim 1 in which the rags are removed by mechanism operated manually.

7. The method of claim 1 in which the rags are washed, dried and baled after removal from the conveyor.

8. The method of claim 1 together with the steps of separating the removed plastics into grades of different sizes, and pelletizing the graded plastics.

9. The method of claim 1 together with the step of grinding glass that has been separated from the refuse.

10. The method of claim 1 together with the steps of passing large bottles which have been separated from the refuse to an auxiliary conveyor, delivering said bottles to a grinder, and passing glass removed from the conveyor to this same grinder.

11. The method of claim 10 in which small bottles removed from the refuse are passed to the auxiliary conveyor.

12. The method of claim 11 in which the bottles and glass are sorted as to size before delivery to the grinder.

13. The method of claim 12 together with the steps of steam cleaning, drying and packing the ground glass.

* * * * *